United States Patent Office 3,093,495
Patented June 11, 1963

3,093,495
MAGNESIA COMPOSITION AND METHOD OF MAKING SAME
Alexander W. von Mickwitz, 701 Main St., Latrobe, Pa.
No Drawing. Filed Mar. 27, 1959, Ser. No. 802,321
5 Claims. (Cl. 106—58)

It is very desirable to economically produce shaped high density magnesia bodies having high MgO content. For some industrial applications, it is also necessary that such MgO bodies be impervious. The uses for such bodies are many; including crucibles and linings for high-temperature operations, spark plug insulators, and electrical applications wherein high resistivity and good dielectric properties are required such as insulators and capacitors, respectively.

Prior to my invention, it was impossible to economically produce a high density MgO body due to the extremely elevated temperatures required in the known processes.

Heretofore, attempts to make dense, impervious MgO bodies of high purity at commercially practicable temperatures such as cone 30, have used "active" forms of MgO. These compositions have never attained commercial application because of the tremendous firing shrinkages involved. The shrinkage of a molded refractory article during firing is very important in determining whether the refractory will be usable in fabricating molded pieces. If the firing shrinkage of the refractory piece is greater than about 30%, the refractory is very difficult to use since usual commercial tolerances cannot be maintained. As firing shrinkage decreases, the ease of maintaining tolerances increases. In contrast to the very high shrinkages heretofore obtained when "active" materials were used, the firing shrinkage of molded pieces made according to my invention is small; therefore, tolerances can be maintained on the pieces and the entire manufacturing operation is now commercially feasible.

In developing any MgO body it is imperative that additives used with the MgO do not destroy the green strength of a body molded from the MgO and additive or the firing stability of the body. My additives fulfill these requirements.

Briefly, my invention comprises a method of manufacturing a magnesia body wherein small quantities of titania are added to very pure magnesia; the materials are commingled to obtain a substantially homogeneous mixture; then pressed, cast or extruded to form the desired bodies; and the bodies are fired between cone 16 and cone 32. The primary advantage of the titania addition to the magnesia is that the firing temperature of the molded body is greatly decreased for obtaining a desired density in the body. The specific temperature at which the bodies are fired depends upon the properties desired in the finished product. Thus, if a body of maximum density and minimum porosity is not necessary for the desired end use to which it is to be put, the body can be fired at lower temperatures; for example: In my process the body may be fired at about cone 18 or 19 for a particular use as against a firing at cone 30 for plain MgO bodies (without titania) for the same use. Thus my invention substantially reduces the initial costs of furnaces for firing MgO bodies and the subsequent operating costs of such furnaces.

I have found that bodies made according to my invention can be formed easily and simply and fired at relatively low temperatures. These bodies have densities up to 3.5 and are impervious at densities above 3.35 and have substantially all the physical and chemical properties of pure magnesia.

The titania which is added to the magnesia acts as a mineralizer effecting recrystallization and densification of the body at much lower firing temperatures than would be required for pure MgO bodies. There is practically no known way of predicting what materials will function as mineralizers since a compound which is a good mineralizer for one material may have no effect on a second material. The titania is not a flux in the body since a flux normally has a large effect on the firing stability of a molded body while the titania does not. In addition, the titania does not detract from the refractoriness of the body which is the normal effect from a flux.

I have found that if small quantities of finely divided $TiO_2$ are added to magnesia, these additions have an appreciable effect upon the densification temperature of the magnesia body. Stated another way: With small quantities of $TiO_2$ added to the MgO, I can reach at the same firing temperatures higher densities than the densities reached without the $TiO_2$ additions. Furthermore, by such $TiO_2$ additions, I can produce an impervious MgO body at commercially feasible firing temperatures below cone 32. I have found that $TiO_2$ additions as small as 0.05% have an appreciable effect on the densification temperature of the MgO body. I have also found that in some circumstances there is little advantage to be gained by adding more titania to the magnesia than about 5% by weight of the magnesia. Additions of titania up to 10% by weight to the magnesia will permit production of a high density magnesia body at low firing temperatures as described above; however, any quantity of titania over 5% by weight is an excess amount so far as the addition serving any useful purpose within the scope of my invention.

I have found that for cast bodies made according to my invention and fired at cone 30, the desirable limits on the titania addition are 0.05%–1.0% by weight.

The following examples illustrate my invention.

Whenever any reference is made to a "cone" followed by a number, "Orton" cones are referred to. Specific examples of "Orton" cone temperatures without "soaking time" referred to herein are:

| | ° F. |
|---|---|
| Cone 8 | 2237 |
| Cone 12 | 2390 |
| Cone 13 | 2462 |
| Cone 15 | 2570 |
| Cone 16 | 2642 |
| Cone 18 | 2705 |
| Cone 19 | 2759 |
| Cone 30 | 3002 |
| Cone 32 | 3092 |

The specific temperature at which a cone will be deformed to any predetermined extent will vary since both time and temperature must be considered and the longer the soaking time in heating a cone, the lower will be the deformation temperature.

Further, by the term "cone" herein I mean a cone at six o'clock unless otherwise indicated. The only exception to this usage is when two cone numbers are separated by a slant line (/) which means that the cone number appearing on the left of the slant line is at six o'clock and the cone number appearing on the right of the slant line is less than six o'clock.

*Example 1*

300 grams of General Electric No. 12700 fused magnesia, which had been premilled in the dry state such that 95% of it passed through a 325 mesh screen, was dry mixed in a kneader mixer in six separate batches for 15 minutes with quantities of titania (Hommel No. 246 made by Calco Chemical Division of American Cyanamid Company—which is an extremely fine particle size titania) constituting respectively each of the following percentages by weight of the respective batches: 0.25%, 0.5%, 1%, 2%, 3%, and 5%. The G.E. No. 12700 fused magnesia is produced by the General Electric Company and it is a 99+% pure fused magnesia.

To each of the batches was added 3 grams of Sunoco yellow wax No. 1290, which had been dissolved in 60 cc. of carbon tetrachloride, and mixed for about five minutes in the kneader mixer.

Disc shaped articles were then pressed from each mixture at about 9,000 p.s.i. with a Carver press. Each of the articles was about 3/16" thick and 2" in diameter in the fired state.

The samples were fired at cone 18/19. The following results were observed:

| Amount of $TiO_2$ Added, percent | Fired | Density | Shrinkage, percent |
|---|---|---|---|
| None | Cone18/19 | 2.52 | 3.5 |
| 0.25 | do | 2.86 | 7.3 |
| 0.5 | do | 2.87 | 7.8 |
| 1.0 | do | 2.88 | 8.2 |
| 2.0 | do | 2.88 | 8.2 |
| 3.0 | do | 2.91 | 8.4 |
| 5.0 | do | 2.94 | 9.3 |

The article which did not contain any titania was then refired at cone 30 and the density was found to be 2.73.

I have found that any fine-grained $TiO_2$ may be used in place of the Hommel No. 246 $TiO_2$; for example: "pigment grade" titania sold by Titanium Pigment Corporation of New York under the names "Titanox-RA" and "Titanox-A-LO." The titania must be fine-grained to ensure as homogeneous a mixture with the magnesia as possible. The "pigment grade" titania has particle sizes all less than 1.0 micron.

*Example 2*

300 grams of General Electric No. 12700 fused dry premilled MgO were dry mixed in a kneader mixer for 15 minutes with 0.15 gram (0.05% by weight of MgO) of $TiO_2$.

3 grams of Sunoco yellow wax No. 1290, dissolved in 60 cc. $CCl_4$, were added to the batch and mixed for 5 minutes.

The mix was then dry screened through an 80 mesh screen. Discs were pressed from the screened mix and fired at cone 19/20.

After firing, the density was found to be 2.66. This is in contrast to a similar plain MgO (no $TiO_2$ addition) disc which had a density of 2.52 when fired at cone 19/20.

I have also secured magnesia bodies having higher densities than those indicated above but without raising the firing temperature above cone 18/19, as exemplified in the following examples:

*Example 3*

15 grams of titania, Hommel No. 246, 750 cc. of methyl alcohol and 1,000 grams of Burundum cylinders were thoroughly milled. 300 grams of General Electric No. 12700 fused dry premilled MgO were then added to the milled mix. This batch was milled for about 10 hours, removed from the mill, dried, and Sunoco yellow wax No. 1290 dissolved in carbon tetrachloride was added to form a batch of a consistency to be pressed. About 3 grams of Sunoco yellow wax No. 1290 dissolved in 60 cc. of carbon tetrachloride were added. This wax solution was milled with the batch for about 5 minutes. Discs were pressed from the mixture with a Carver press in the same manner as in Example 1. After firing the discs at cone 18/19, the density of the body was found to be 3.14. This is in contrast to a density of 2.93 for a disc having the same titania content but produced in a dry mixing process as in Example 1. The discs, however, were not impervious after firing.

Other alcohols such as ethyl alcohol may be used in the wet milling process of Example 2 if the alcohols are inert under the condition of use and of low viscosity. Any other milling fluids can be used which are inert to the MgO and will avoid hydrating the MgO and are of low viscosity. My purpose in milling the material in the methyl alcohol is to secure a more homogeneous mixture.

I have also found that a pressed high density, impervious magnesia body can be secured at relatively low firing temperatures. Such a body has tremendous commercial utility, specifically in electrical adaptations. I have also found that the range of temperatures at which such a body can be fired is very large, i.e., cone 18 to cone 32. This fact is extremely advantageous from the production standpoint since the bodies can be fired in various types of kilns. The following example illustrates such a body:

*Example 4*

I have used an unfused magnesia of high surface area to produce an impervious magnesia body with low firing shrinkage at reasonable firing temperatures. Such a magnesia is, for example, the "heavy-grade" magnesia designated Mallinckrodt USPXIV. This magnesia is of high purity (99+% MgO) and had been previously calcined at cone 13 to remove $H_2O$ and $CO_2$ but was not fused. I have found, however, that if the magnesia is calcined at any cone between 8 and 15, it will also operate effectively to produce impervious bodies.

300 grams of the "heavy-grade" Mallinckrodt USPXIV magnesia was mixed with 15 grams of titania, Hommel No. 246, 750 cc. of methyl alcohol, and 1,000 grams of Burundum balls. The mixture was milled for about ten hours. The milled mixture was then removed from the mill, dried, and a wax binder consisting of 3 grams of Sunoco yellow wax No. 1290 dissolved in 60 cc. of carbon tetrachloride was thoroughly mixed with this batch for a period of about 5 minutes. Discs were pressed from the batch at 9,000 p.s.i. in a Carver press in the same manner as in Example 1 and the bodies were fired at cone 18/19.

After firing, the bodies were impervious and their densities were found to be 3.44 and the firing shrinkage about 18%. The firing shrinkage was calculated:

$$\frac{\text{Green size-fired size}}{\text{fired size}} \times 100$$

The bodies were then refired at cone 30 and the density after the refiring was found to be 3.45 (practically no change.) The additional shrinkage was only about 1% and no blistering of the bodies occurred.

The bodies were tested for and exhibited high dielectric qualities: $\tan \delta = 2.3 \times 10^{-4}$; and a dielectric constant between 5 and 6.

I have also found that magnesia bodies according to my invention can be formed by extrusion as exemplified by the following example:

*Example 5*

2,000 grams of G.E. No. 12700 fused dry premilled magnesia, as described in Example 1, were mixed in a first batch containing 5 grams of Hommel No. 246 titania. Each batch contained 5,000 grams of Burundum cylinders, 140 grams of ceramic flour, and 20 grams of "Methocel." The ceramic flour is an organic binder made from corn flour and sold by the Illinois Cereal Mills under the tradename "Cera-Mic." The "Methocel" is a methyl cellulose sold by the Dow Chemical Company.

Each of the batches was dry ball-mixed for three hours and then 16% water by weight was added. The mixing was continued for 5 minutes more. Each batch was then extruded in the form of swaging tubes (thermocouple insulators).

Normally, swaging tubes fabricated from plain magnesia (without any titania addition) must be fired at cone 16/17 to give the tubes the desired strength. However, I found that small additions of titania to the cagnesia, as given in this example, permitted the swaging tubes to be fired at cone 12/13 without any substantial loss of ultimate strength.

After firing the swaging tubes at cone 12/13, I tested them for cross breaking loads and found the following: The swaging tubes which contained 0.25% titania had a cross breaking load of 221 grams as an average; and the swaging tubes which contained 1% titania had a cross breaking load of 240 grams as an average. A cross breaking load of 221 grams is sufficient to meet the requirements of most users of swaging tubes.

I also fired a swaging tube fabricated from plain magnesia without any titania therein at cone 13. In testing this tube for cross breaking load, I found it to be only about 40% of that of similar tubes which had been fired at cone 16/17, or about 100 grams.

I have also found that I can cast magnesia-titania bodies according to my invention and when fired at cone 30 the bodies are impervious having a water absorption between zero and a few hundredths of 1%. The densities of these bodies far exceed the densities of plain magnesia bodies which are fired at cone 30. The following examples illustrate these bodies:

*Example 6*

Four batches were formulated: the first did not contain any titania; the second contained 5.3 grams (0.125%) Hommel No. 246 titania; the third contained 10.5 grams (0.25%) Hommel No. 246 titania; and the fourth contained 21 grams (0.5%) Hommel No. 246 titania.

Each batch was formulated of the titania, 5000 grams of Burundum cylinders, 1250 cc. water, and 4200 grams of dry premilled G.E. No. 12700 fused magnesia. These batches were each milled for ten hours. Each batch was then poured into separate molds for slip casting crucibles having a 1⅜" diameter and a 3" height.

The crucibles which did not contain any titania were fired at cone 18/19. They were porous and had a density of 2.6 after firing.

The crucibles which did not contain any titania were then refired at cone 30. They remained porous and had a density of 2.9 after this refiring.

The crucibles which contained 0.125% titania were fired at cone 30. After firing, they had a density of 3.39 and were impervious when subjected to an ink test.

The crucibles which contained 0.25% titania were fired at cone 30. After firing, they had a density of 3.41 and were impervious when subjected to an ink test.

The crucibles which contained 0.5% titania were fired at cone 30. After firing they had a density of 3.47 and were impervious when subjected to an ink test.

All of the crucibles in this example containing titania had a water absorption between zero and 0.02%.

My magnesia body containing 0.25% titania and which was fired at cone 18/19 had an average modulus of rupture of 19,600 p.s.i. and a maximum modulus of rupture of 20,300 p.s.i. My magnesia body containing 0.5% titania and which was fired at cone 19 had an average modulus of rupture of 18,200 p.s.i. and a maximum modulus of rupture of 20,400 p.s.i. A modulus of rupture of 11,700 p.s.i. heretofore has been considered usual for pure magnesia bodies.

I have also found that my magnesia-titania mixtures are useful as cements in high-temperature furnaces. The mixtures can be used for uniting refractory bricks together or patching areas of the furnace, or embedding heating elements. The mixture sets to a high early strength in use prior to firing and, therefore, is easy to use.

The following example illustrates my new cement composition:

*Example 7*

2,000 grams of General Electric No. 429 (99% pure magnesia, coarse particle manufactured by the General Electric Company), was mixed with 2,000 grams of General Electric No. 429 magnesia which had been pre-milled dry such that only 4% was retained on a 325 mesh screen. 200 grams of Hommel No. 246 titania were added to the magnesia and this batch was mixed for 30 minutes in the Lancaster mixer. The batch was subdivided into numerous smaller batches, each containing 400 grams of the above mixture. To the first smaller batch I added 50 grams $H_2O$; to the second, 100 grams $H_2O$; and to the third, 150 grams $H_2O$. I found that the most useful and easy to handle mixture had about the consistency of sour cream. However, I found that thinner or thicker mixtures were useful, depending upon the end use.

Each mix was then used to cement refractory bricks together and it was found that after two days, the binding action of the mix was extremely strong at room temperature even before firing. I attribute this early strength to a partial hydration of the magnesia.

The cement and refractory bricks were then fired at cone 16/17. An excellent binding strength was noted after the firing since the bricks could not be broken apart by manual pressure.

I found the melting point of this cement mix to be greater than 2050° C.

I prepared a second batch of cement in the same manner as described above but without any titania addition. Small discs were shaped from this batch and fired at cone 17/18. I also shaped similar discs from cement made according to my invention and fired them at cone 16/17. I found that when the plain magnesia disc was rubbed against the magnesia-titania disc, the abrasion resistance of the plain magnesia disc was 2½ times less than the magnesia-titania discs.

The "Sunoco yellow wax No. 1290" recited in this application is sold under the name "Sunoco 1920 Impregnating Wax" by Sun Oil Company Inc. The purpose in using this wax in the molded article described herein is to bond the magnesia-titania mixture together so that the article has sufficient green strength, and to function as a lubricant to permit proper release of a pressed article from the die. Other waxes obviously can be used in my invention without departing from the spirit of my invention.

The "Burundum" cylinders referred to herein are manufactured by U.S. Stoneware in Akron, Ohio. Any other milling medium can be used for practicing my invention so long as the medium has high density and is extremely hard whereby contamination of the material being milled is avoided.

The "ink test" referred to herein is an accepted ceramic test to determine surface porosity of a body. The test involves drawing an ink line with a conventional pen on the test piece, permitting the ink to dry, and then washing the ink from the test piece if possible. The surface porosity is determined by evaluating the ink remaining on the piece after the washing step. As surface porosity increases, difficulty in removing the ink also increases. The "water absorption" test is more accurate for porosity to determine density.

While I have described a present preferred embodiment of my invention, it may be otherwise embodied within the scope of the following claims.

I claim:

1. A method of making a substantially impervious, high-density, refractory, ceramic shaped article having a density of at least 2.85 g./cc. and a magnesium oxide content of at least about 95% by weight, said method comprising forming a finely divided, particulate, intimate mixture of unhydrated magnesium oxide of high purity and, as a mineralizer therefor, a small but effective amount of titanium oxide in the range from about 0.05% to about 5% by weight of the magnesium oxide, forming from said mixture a coherent shape in which the magnesium oxide is substantially unhydrated, and sintering said shape between cone 16 and cone 32 to produce said shaped refractory article, the shrinkage during firing being substantially less than 30%.

2. A method as set forth in claim 1 in which said shaped article has a density of at least 3.35 g./cc., and in which a mixture of fused, high-purity magnesium oxide and from about 0.125% to about 1% by weight of titanium oxide, based on the magnesia, is slip cast to the desired shape and thereafter sintered at cone 30.

3. A method as set forth in claim 1 in which said shaped article has a density of at least 3.35 g./cc., and in which a mixture of high-purity, unfused magnesium oxide, from about 0.125% to about 5% by weight of titanium oxide, based on the magnesia, and a small amount of a temporary bond are pressed to the desired shape and thereafter sintered at cone 18 to 30.

4. A substantially impervious, high-density, refractory, fired ceramic shaped article having a minimum density of 2.85 g./cc., said article consisting essentially of at least about 99% by weight of magnesium oxide and, as a mineralizer, from about 0.05% to about 1% by weight of titanium dioxide based on the magnesium oxide.

5. An article as set forth in claim 4 in which the density of the article is at least 3.35 g./cc. and said article has a water absorption of from 0 to 0.02%.

References Cited in the file of this patent

UNITED STATES PATENTS

| | | |
|---|---|---|
| 2,636,244 | Williams | Apr. 28, 1953 |
| 2,695,242 | Woodward | Nov. 23, 1954 |
| 2,798,002 | Porter | July 2, 1957 |
| 2,876,122 | Whittemore | Mar. 3, 1959 |